United States Patent [19]

Daniel et al.

[11] 4,070,675
[45] Jan. 24, 1978

[54] POWER REJECTION APPARATUS USING A NULL-CONSTRAINED SUBARRAY FOR MTI RADAR APPLICATIONS

[75] Inventors: Sam M. Daniel, Tempe; Eric Jerome Carlson, Mesa, both of Ariz.

[73] Assignee: Motorola Inc., Schaumberg, Ill.

[21] Appl. No.: 734,699

[22] Filed: Oct. 21, 1976

[51] Int. Cl.² ............................................. H04B 7/00
[52] U.S. Cl. ............................. 343/100 LE; 343/7.7
[58] Field of Search ....................... 343/100 LE, 7.7

[56] References Cited

U.S. PATENT DOCUMENTS

| | | | |
|---|---|---|---|
| 3,202,990 | 8/1965 | Howells | 343/100 LE |
| 3,964,065 | 6/1976 | Roberts et al. | 343/100 LE |

*Primary Examiner*—Maynard R. Wilbur
*Assistant Examiner*—Richard E. Berger
*Attorney, Agent, or Firm*—Eugene A. Parsons

[57] ABSTRACT

The present invention involves the use of an adaptive power injection apparatus with an existing antenna having a radiation pattern characterized by a relatively narrow main beam and a plurality of low level sidelobes for the purpose of enhancing the performance of the main antenna in a jamming evironment. The said apparatus consists of an adaptive subarray constrained to maintain a null in the direction of the main beam of the existing antenna. More specifically, the said adaptive array is composed of several individual antennae having relatively wide-beam patterns and combined with the existing antenna through individual IF stages all identical to the IF stage of the existing antenna, individual phase shifters which provide phases necessary for maximum reception from the direction of the main beam of the existing antenna and individual adjustable weights. The weights, which may consist of voltage controlled amplifiers or equivalent devices are adjusted by means of individual signals derived from correlating each corresponding auxilliary antenna signal with the combined signal at the output of the summing network and subsequently subtracting each such signal from the overall average. Setting the weights originally to have a zero average value creates a null in the direction of the main beam. Consequently, subsequent weight adjustments by means of individual adjusting signals whose combined average is zero will maintain the null in the said direction. In an MTI application, the apparatus described would leave the main beam practically intact while serving, at the same time, to mimimize interferring sidelobe power. Thus avoiding undesirable amplitude modulation of the main beam signals that would otherwise arise without the presence of the constrained null.

7 Claims, 3 Drawing Figures

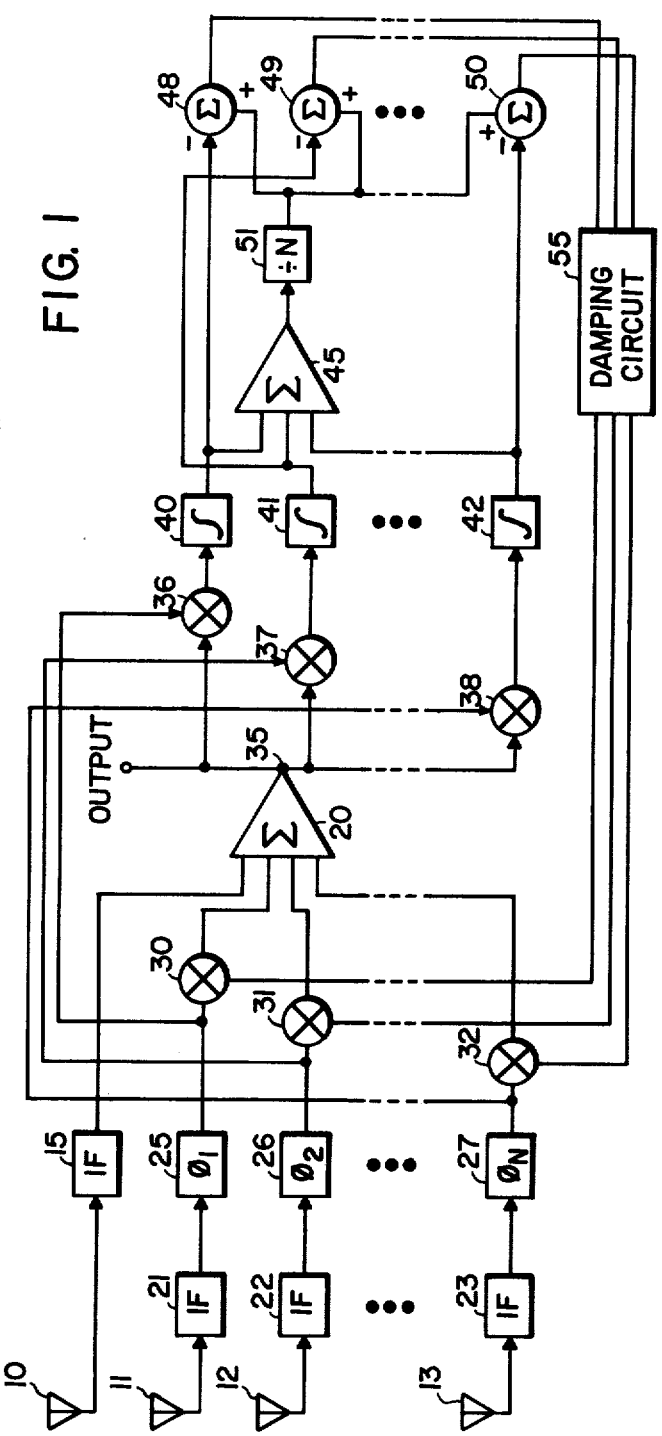
FIG. 1
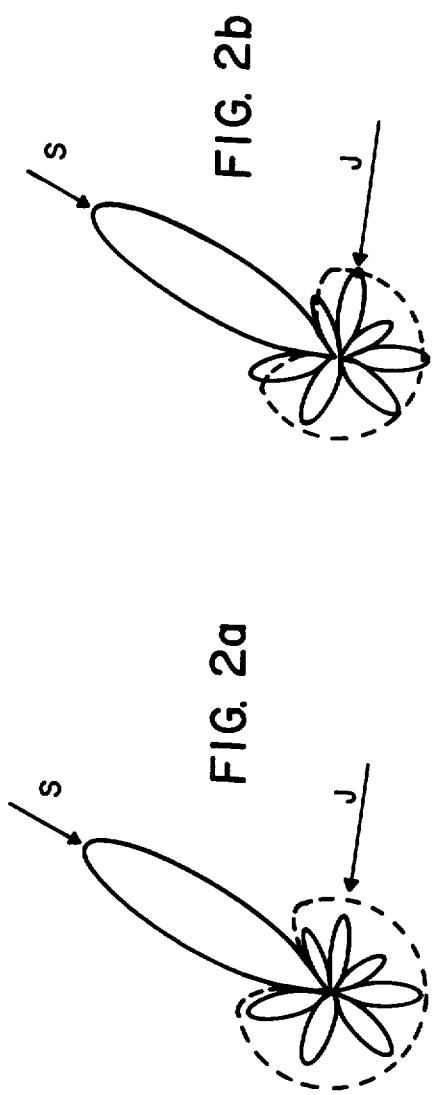
FIG. 2a
FIG. 2b

POWER REJECTION APPARATUS USING A NULL-CONSTRAINED SUBARRAY FOR MTI RADAR APPLICATIONS

BACKGROUND OF THE INVENTION

In radar systems utilizing a main antenna having a radiation pattern with a relatively narrow main lobe and a plurality of relatively low sidelobes, it is common practice to incorporate null steering apparatus or to incorporate other types of apparatus which effectively cancel jamming signals and the like which are received by the radar through one of the sidelobes of the main antenna. Typical null steering apparatus is described in U.S. Pat. No. 3,202,990, entitled "Intermediate Frequency Sidelobe Canceller", and issued to Paul W. Howell, on Aug. 24, 1965. One of the major problems with null steering apparatus is that desired signals to be received via the main beam of the main antenna cannot be distinguished from jamming signals and the like whether or not they are received via the main beam or sidelobe region. Hence, the null steering apparatus can create a null at the main lobe which will completely or partially eliminate the desired signal return. Further, if the null steering apparatus is being utilized with radars, such as a moving target indicator (MTI) radar, the main lobe may be amplitude modulated, thus yielding erroneous returns while masking over any existing ones.

SUMMARY OF THE INVENTION

In a communications system, such as a radar or the like, including a main antenna having a radiation pattern characterized by a relatively narrow main lobe and a plurality of relatively low sidelobes, adaptive power rejection apparatus using a null-constrained subarray of a plurality of secondary antennas and including means associated with each secondary antenna for shifting the phase of the signal before applying it to an adjustable weighting device, with the output of all the weighting devices being combined and operated on to provide a feedback signal to adjust the weighting devices, which feedback signal is controlled so that the radiation pattern of the secondary antennas minimizes the sidelobe power in the radiation pattern of the main antenna and has substantially no effect on the main lobe of the main antenna.

It is an object of the present invention to provide new and improved adaptive sidelobe power rejection apparatus using a null-constrained subarray.

It is a further object of the present invention to provide adaptive sidelobe power rejection apparatus null-constrained subarray for MTI radar applications.

It is a further object of the present invention to provide adaptive sidelobe power rejection apparatus using a null-constrained subarray in the main beam direction so that only sidelobe power is rejected and the entire adapative sidelobe power rejection apparatus can be added to an existing system and, therefore, is relatively inexpensive and simple to install.

These and other objects of this invention will become apparent to those skilled in the art upon consideration of the accompanying specification, claims and drawings.

BRIEF DESCRIPTION OF THE DRAWINGS

Referring to the drawings:

FIG. 1 illustrates a block diagram of a portion of a communications system employing adaptive sidelobe power rejection apparatus connected thereto, which embodies the present invention; and FIG. 2a and b illustrate typical combined antenna patterns before and after adaptation of the apparatus of FIG. 1, respectively.

DESCRIPTION OF THE EMBODIMENT

Referring to the drawing the numeral 10 designates a main antenna, which is illustrated as a single element but which may include a plurality of elements situated to produce a desired radiation pattern. The main antenna 10 has a radiation pattern characterized by a relatively narrow main lobe and a plurality of relatively low level sidelobes. A plurality of secondary antennas, designated 11, 12 and 13, form a sub-array, generally mounted adjacent and in cooperation with the main antenna 10, however, since the sub-array may be added to an already completed communications system it will generally be mounted in same convenient but effective position. Signals from the antenna 10 pass through an IF stage 15 to one input of a summing circuit 20. Signals from each of the antennas 11, 12 and 13 are connected through IF stages 21, 22 and 23, respectively, to phase shifting circuits or networks 25, 26 and 27, respectively. It should be understood that three antennas 11, 12 and 13 are illustrated in the present sub-array but that any required number of antennas, or elements, might be utilized to provide the desired results. In the present disclosure, the antenna 13 and the circuitry associated therewith is designated with a sub "$n$" to indicate that it is the last element and circuit in a series of "$n$" elements and circuits.

The signals from the phase shifting circuits 25, 26 and 27 are applied to adjustable weighting means 30, 31 and 32, respectively. Weighting means 30, 31 and 32 may consist of voltage controlled amplifiers or involve multipliers, etc. Each of the adjustable weighting means 30, 31 and 32 has a signal input, connected to the phase shifting circuits 25, 26 and 27, a signal output and a control input, which will be described in conjunction with the remainder of the circuitry. The signal outputs from the weighting circuits 30, 31 and 32 are connected to "$n$" inputs of the summing circuit 20. All of the input signals applied to the summing circuit 20 are summed together and appear as a single signal at the output, designated 35, thereof. The output 35 of the summing circuit 20 has an output terminal connected thereto, which is the output signal for the system and is utilized in the remainder of the communications system (not shown).

The output 35 of the summing circuit 20 is connected to an input of each of $n$ different correlation circuits including multipliers 36, 37 and 38 and integrators 40, 41 and 42. Each of the multipliers 36, 37 and 38 has a second input connected to the output of the phase shifting circuits 25, 26 and 27, respectively. Thus, the correlating circuits correlate the sum signal from the summing circuit 20 with each of the unadjusted signals from the phase shifting circuits 25, 26 and 27. The outputs of the multipliers 36, 37 and 38 are applied through the integrating circuits 40, 41 and 42, respectively, to $n$ inputs of a summing circuit 45 and to the negative input terminals of $n$ summing circuits 48, 49 and 50, respectively. The output of the summing circuit 45 is connected through a divide by $n$ network 51 to positive inputs of the three summing circuits 48, 49 and 50. Thus, the average signal supplied to the summing circuits 48, 49 and 50 from the divider 51 is added to the negative of the output signals of the integrators 40, 41 and 42. The signals at the outputs of the summing circuits 48, 49 and 50 are applied to the control inputs of the weighting circuits 30, 31 and 32 through a dumping circuit, or loop stabilization network, 55 to adjust the amplification or weighting of the signal for stable operation.

In the operation of the illustrated system the phase shifting circuits 25, 26 and 27 are adjustable, during calibration of the system, and are adjusted so that the radiation pattern of the subarray forms a null in the direction of the main lobe of the main antenna 10 when the sum of all the weights of the weighting circuits 30, 31 and 32 is 0. Thus, any of the main lobe signal which is present in the subarray is effectively nulled out during the initial calibration of the system by the adjustment of the phase shifting circuits 25, 26 and 27. This initial calibration should be performed with substantially no signals being received by the system except a calibrating signal in the direction of the main lobe. It should be understood, that one of the main purposes of the present system is for operation in conjunction with an MTI, moving target indicator, radar and that in many instances the main lobe of the radar may be movable relative to the device on which the system is mounted, such as an airplane or the like. Generally, the main lobe can be shifted to several different predetermined positions and, in each position, the phase shifting circuits 25, 26 and 27 are preadjusted or precalibrated to shift the null in the subarray to conform with the position of the main lobe. The phase shifting circuits are then switched to the precalibrated position which corresponds with the position of the main lobe.

Once the phase shifting circuits 25, 26 and 27 are adjusted so that a null is formed in the subarray which corresponds with the direction of the main lobe in the radiation pattern of the main antenna 10, the system is capable of providing sidelobe power rejection in substantially any direction, except in the direction of the main lobe, in which an undesirable signal is received. Any undesirable signal that is present at the output of the weighting circuits 30, 31 and/or 32 is summed in the summing circuit 20 and applied to each of the correlating circuits. The average of all of the outputs of the integrating means 40, 41, and 42 is then added to the negative of each of the outputs and the remaining signal is used to adjust the weighting circuits 30, 31 and/or 32. In this fashion the weighting circuits 30, 31 and 32 are gradually adjusted to reject unwanted sidelobe power and the loop continues to adjust the weighting circuits 30, 31 and 32 while constraining the sum of all of the weights to zero thus maintaining the null in the main beam direction. Because the system is constrained to form a null in the subarray which corresponds with the main lobe in the main antenna, the power in the main lobe cannot be inadvertantly amplitude modulated or substantially effected in the amount of power received, so that the main antenna receives main lobe power substantially as it does without the sub-array being connected in conjunction therewith. However, the sidelobes of the main antenna are affected because the power therein due to jamming signals or the like is minimized and, in effect, a combined null is formed which corresponds with the unwanted jamming signals and the like. While an analog system has been disclosed, it should be understood that the system might be provided in digital form by those skilled in the art. Further, if an antenna subarray can be constructed so as to physically provide a null in the direction of the main beam then the averaging circuitry can be eliminated, although it can be left in if desired.

It should also be understood that weighting means 30, 31 and 32 might be of increased complexity involving complex weights with in-phase and quadrature signals, or even tapped delay lines providing more degrees of freedom thus requiring fewer front-end channels. In addition, for wideband operation the phase shifting circuits 25, 26 and 27 may consist of more appropriate phase networks which provide the phase shifts desired over the frequency of operation.

While we have shown and described a specific embodiment of this invention, further modifications and improvements will occur to those skilled in the art. We desire to be understood, therefore, that this invention is not limited to the particular form shown and we intend in the appended claims to cover all modification which do not depart from the spirit and scope of this invention.

What is claimed is:

1. In a communications system, such as radar and the like, including a main antenna having a radiation pattern characterized by a relatively narrow main lobe and a plurality of relatively low sidelobes, adaptive sidelobe power rejection apparatus using a null-constrained subarray comprising:
  a. A plurality of secondary antennas forming a subarray;
  b. Phase shifting means coupled to said secondary antennas for shifting the phase of output signals to any predetermined phase;
  c. Adjustable weighting means coupled to said phase shifting means and providing outputs weighted in accordance with the adjustments of said weighting means;
  d. Combining means connected to the main antenna for receiving output signals therefrom and connected to said weighting means for receiving the outputs therefrom, said combining means having an output; and
  e. Controller means coupled to said secondary antennas, the output of said combining means and said adjustable weighting means for adjusting said weighting means so that the radiation pattern of said secondary antennas minimizes the sidelobe power in the radiation pattern of said main antenna and has substantially no effect on the main lobe of the main antenna.

2. Adaptive sidelobe power rejection apparatus as claimed in claim 1 wherein the controller means includes correlation means for correlating signals at the output of the combining means and signals at each of the plurality of secondary antenna for providing a plurality of correlated signals.

3. Adaptive sidelobe power rejection apparatus as claimed in claim 2 wherein the controller means includes averaging means coupled to the correlation means for providing an average signal indicative of the average of all of the correlated signals and for subtracting each correlated signal from this average.

4. Adaptive sidelobe power rejection apparatus as claimed in claim 3 wherein the controller means includes means of connecting the correlated signals minus the average signal to the adjustable weighting means for controlling the weighting of the signals passing therethrough.

5. Adaptive sidelobe power rejection apparatus as claimed in claim 1 wherein the phase shifting means is adjusted so that a null is formed in the pattern of the sub-array in the direction of the main lobe of the main antenna when the sum of all the weights in the adjustable weighting means is equal to zero.

6. Adaptive sidelobe power rejection apparatus as claimed in claim 1 wherein integrating means are coupled into the loop including the adjustable weighting means, the combining means and the controller means for smoothing the signals in the loop and providing some memory.

7. Adaptive sidelobe power rejection apparatus as claimed in claim 1 wherein the communications system is a moving target indicator (MTI) radar.

* * * * *